(12) United States Patent
Merchant

(10) Patent No.: US 6,778,547 B1
(45) Date of Patent: Aug. 17, 2004

(54) METHOD AND APPARATUS FOR IMPROVING THROUGHPUT OF A RULES CHECKER LOGIC

(75) Inventor: Shashank C. Merchant, Sunnyvale, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/315,849

(22) Filed: May 21, 1999

(51) Int. Cl.[7] .............................................. H04L 12/56
(52) U.S. Cl. ........................ 370/422; 370/419; 370/389
(58) Field of Search ................................. 370/389, 390, 370/398, 395.32, 395.52, 395.53, 412, 413, 414, 415, 416, 417, 418, 419, 420, 422, 423, 428, 429, 432, 392

(56) References Cited

U.S. PATENT DOCUMENTS

| | | | | | |
|---|---|---|---|---|---|
| 5,818,842 A | * | 10/1998 | Burwell et al. | ............. | 370/397 |
| 6,046,979 A | * | 4/2000 | Bauman | ..................... | 370/229 |
| 6,182,185 B1 | * | 1/2001 | Stokes | ........................ | 710/132 |
| 6,336,156 B1 | * | 1/2002 | Chiang | ........................ | 710/45 |
| 6,449,274 B1 | * | 9/2002 | Holden et al. | ............. | 370/392 |

* cited by examiner

Primary Examiner—Steven H. D Nguyen
Assistant Examiner—Thien D Tran
(74) Attorney, Agent, or Firm—McDermott Will & Emery LLP

(57) ABSTRACT

An integrated multiport switch operating in a packet switched network utilizes an internal rules checker (IRC) to process data frames. The IRC employs a modular, pipelined architecture that enables data frames to be processed simultaneously, thereby increasing data throughput.

18 Claims, 10 Drawing Sheets

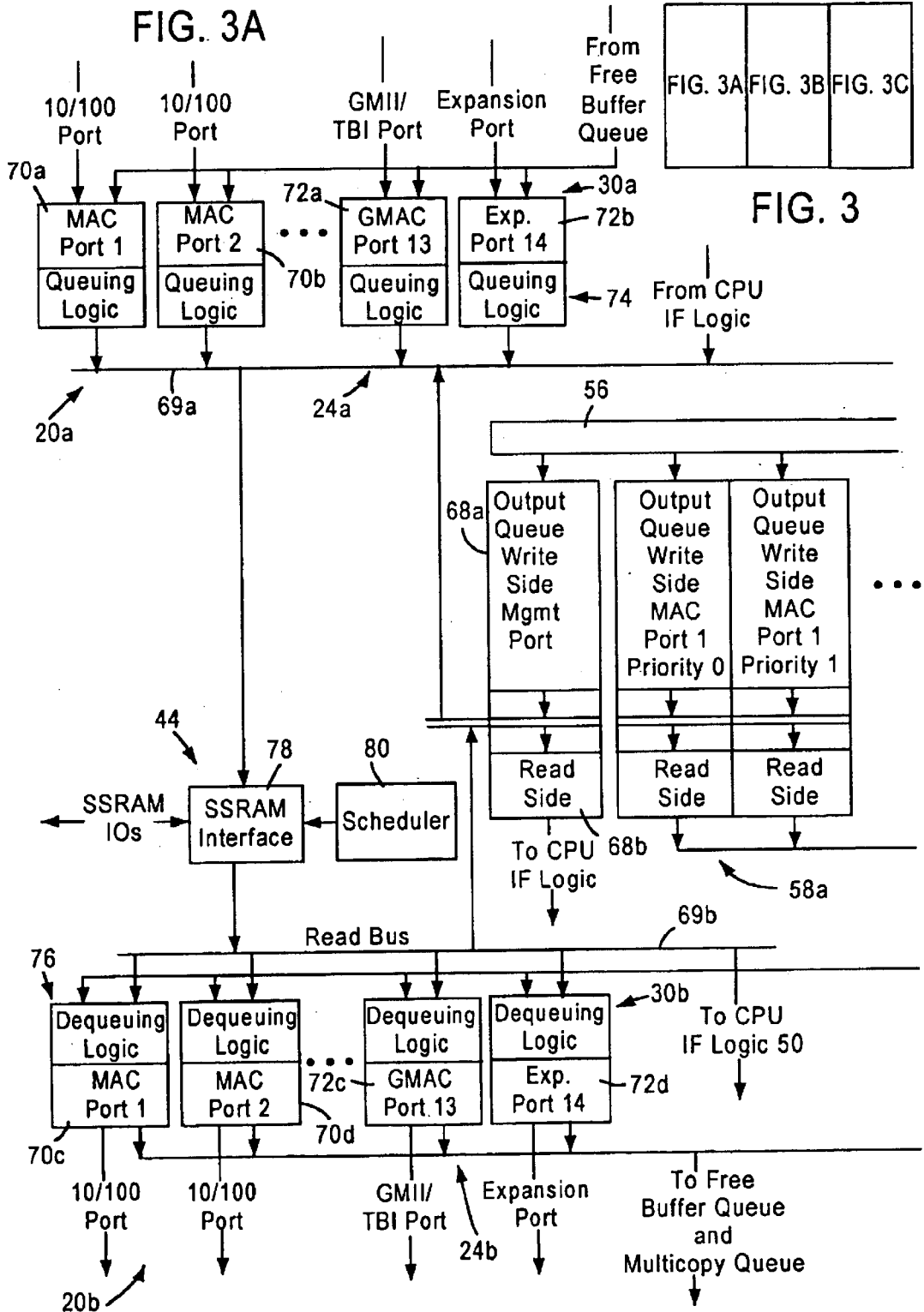

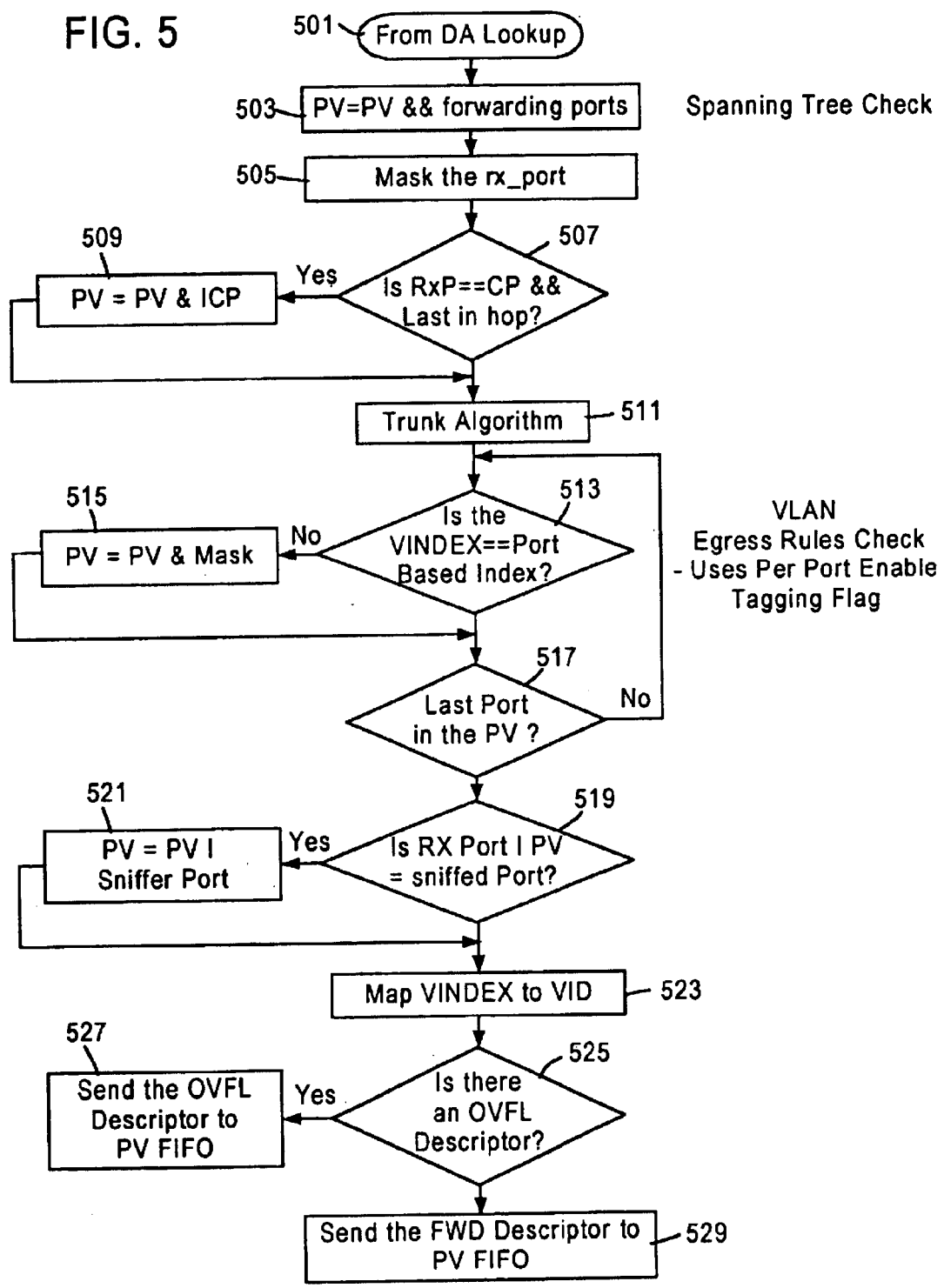

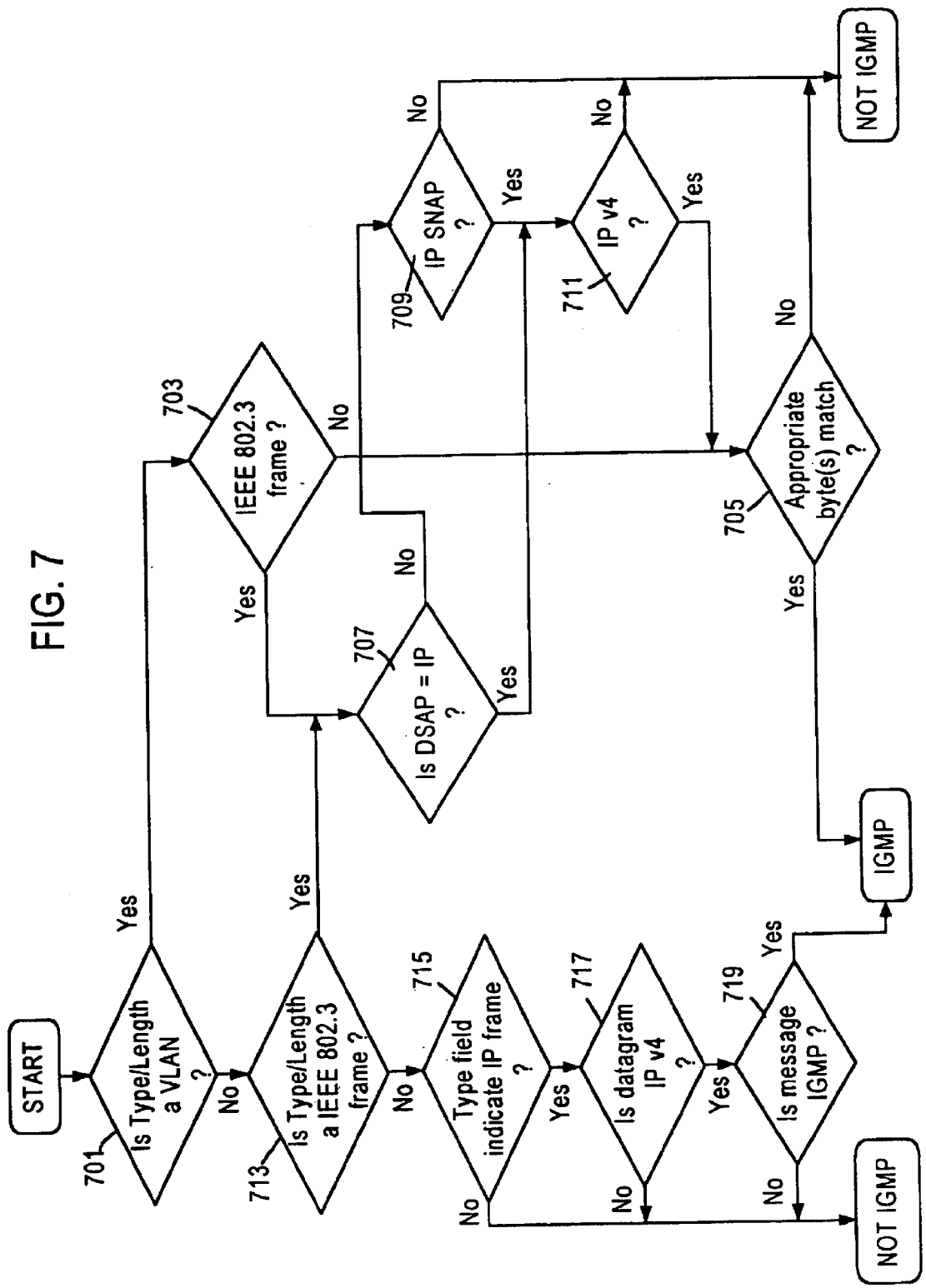

US 6,778,547 B1

METHOD AND APPARATUS FOR IMPROVING THROUGHPUT OF A RULES CHECKER LOGIC

BACKGROUND OF THE INVENTION

1. Technical Field

The present invention relates to data communication networking devices, more particularly, to the data frame forwarding capability of a data network switch.

2. Background Art

A multiport data network switch conventionally permits data communication among a plurality of media stations in a local area network. Each station in the network is associated with a port of the switch. Data frames, or packets, are transferred between stations by data network switch media access control (MAC) circuitry, or "engines," for each switch port. The network switch passes data frames received from a transmitting station to a destination station based on the header information in the received data frame. The switch can link the network to other networks through one or more predesignated switch ports.

The network switch includes switching logic for receiving and forwarding frames to the appropriate destinations. When all of the stations connected to the network are simultaneously operating, packet traffic on the shared path can be heavy with little time between packets. As the switch experiences congestion, data loss and switch latency pose a serious problem. Adding VLAN capability to the network imposes additional challenges to the design of the switch in terms of logic complexity and switch latency; hence, further burdening the switching logic. As a result, the system is less reliable.

SUMMARY OF THE INVENTION

There exists a need for a switching device that includes a decision making engine (i.e., state machines) designed to support networks requiring a high data throughput. There is also a need for distributing the process of forwarding data frames to avoid processing bottlenecks in the system and to increase system reliability.

These and other needs are satisfied by the present invention, where a multiport switch includes a decision making engine used to make frame forwarding decisions, in part, by outputting forwarding information. The decision making engine is designed in a pipelined, modular fashion so that multiple frames may be processed simultaneously.

According to one aspect of the present invention, a multiport switch is configured for processing a data frame. The multiport switch comprises a plurality of ports for outputting the data frame. A plurality of ports is responsible for outputting the data frame. The rules checker logic is configured to operate in a pipeline manner to process the data frame. The rules checker logic includes a plurality of ingress state machines that are configured for receiving a header of the data frame, determining data frame type, and extracting or deriving frame information from the header. Each of the ingress state machines concurrently performs ingress functions based upon on portions of the header or the frame information. A plurality of egress state machines are configured for generating a descriptor. The descriptor has a port vector that selectively specifies which of the ports the data frame is to be transmitted from or whether the data frame is to be filtered. Port logic is configured for receiving and decoding the descriptor from the rules checker logic. Because the rules checker logic possesses a modular, pipelined architecture, the data frame forwarding rate is enhanced.

Still another aspect of the present invention provides a method of forwarding a data frame in a switching system having a plurality of ports for outputting the data frame. The method comprises performing ingress functions using a plurality of ingress state machines. The ingress functions include receiving a header of the data frame, determining data frame type; and extracting or deriving frame information from the header. The method further includes performing egress functions using a plurality of egress state machines. The egress functions encompass generating a descriptor. The descriptor has a port vector that selectively specifies which of the ports the data frame is to be transmitted from or whether the data frame is to be filtered. The method also includes receiving and decoding the descriptor that comprises a port vector. This method advantageously outputs a forwarding descriptor efficiently, thereby increasing the data throughput of the multiport switch.

Additional advantages and novel features of the invention will be set forth in part in the description which follows, and in part may become apparent to those skilled in the art upon examination of the following or may be learned by practice of the invention. The advantages of the invention may be realized and attained by means of the instrumentalities and combinations particularly pointed out in the appended claims.

BRIEF DESCRIPTION OF THE DRAWINGS

FIG. 5 is a flow diagram of the generation of a forwarding descriptor by the IRC in accordance with an embodiment of the present invention.

FIG. 7 is a flow diagram showing the operation of the parsing state machine according to an embodiment of the present invention.

DETAILED DESCRIPTION OF ILLUSTRATIVE EMBODIMENTS

The present invention will be described with the example of a switch operating in a packet switched network, such as an Ethernet (IEEE 802.3) network. It will become apparent, however, that the present invention is also applicable to other packet switched systems, as described in detail below, as well as to other types of systems in general.

Switch Architecture Overview

Figure 1:
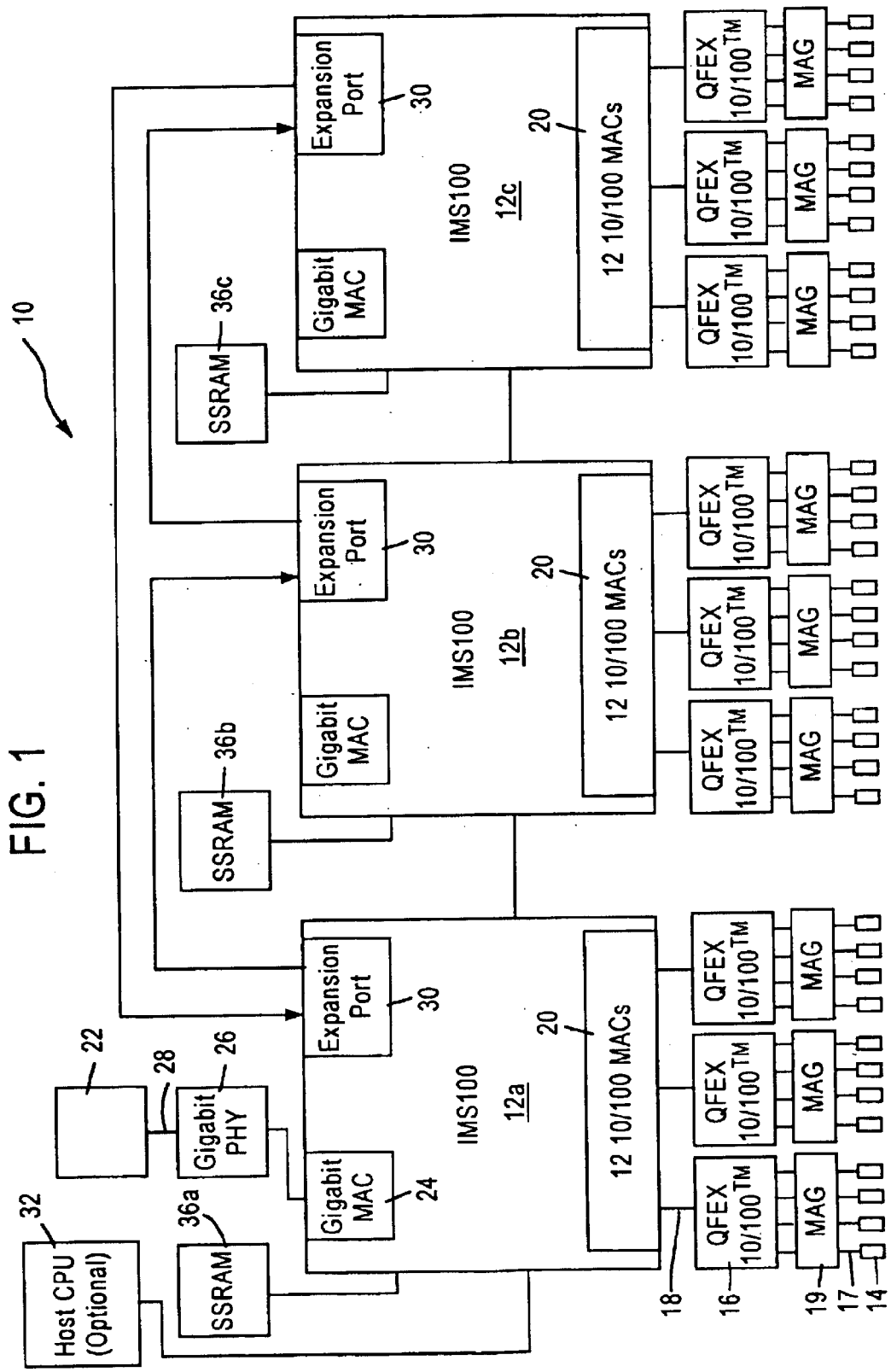
FIG. 1 is a block diagram of a packet switched network including a multiple port switch.

FIG. 1 is a block diagram of an exemplary system in which the present invention may be advantageously employed. The exemplary system 10 is a packet switched network, such as an Ethernet (IEEE 802.3) network. The packet switched network includes integrated multiport switches (IMS) 12 that enable communication of data packets between network stations. The network may include network stations having different configurations, for example twelve (12) 10 megabit per second (Mb/s) or 100 Mb/s network stations 14 (hereinafter 10/100 Mb/s) that send and receive data at a network data rate of 10 Mb/s or 100 Mb/s, and a 1000 Mb/s (i.e., 1 Gb/s) network node 22 that sends and receives data packets at a network speed of 1 Gb/s. The gigabit node 22 may be a server, or a gateway to a high-speed backbone network. Hence, the multiport switches 12 selectively forward data packets received from the network nodes 14 or 22 to the appropriate destination based upon Ethernet protocol.

Each multiport switch 12 includes a media access control (MAC) module 20 that transmits and receives data packets to and from 10/100 Mb/s physical layer (PHY) transitives 16 via respective reduced media independent interfaces (RMII) 18 according to IEEE 802.3u protocol. Each multiport switch 12 also includes a gigabit MAC 24 for sending and receiving data packets to and from a gigabit PHY 26 for transmission to the gigabit node 22 via a high speed network medium 28.

Each 10/100 Mb/s network station 14 sends and receives data packets to and from the corresponding multiport switch 12 via a media 17 and according to either half-duplex or full duplex Ethernet protocol. The Ethernet protocol ISO/IEC 8802-3 (ANSI/IEEE Std. 802.3, 1993 Ed.) defines a half-duplex media access mechanism that permits all stations 14 to access the network channel with equality. Traffic in a half-duplex environment is not distinguished over the medium 17. Rather, each half-duplex station 14 includes an Ethernet interface card that uses carrier-sense multiple access with collision detection (CSMA/CD) to listen for traffic on the media. The absence of network traffic is detected by sensing deassertion of a receive carrier on the media. Any station 14 having data to send will attempt to access the channel by waiting a predetermined time, known as the interpacket gap interval (IPG), after deassertion of the receive carrier on the media. If a plurality of stations 14 have data to send on the network, each of the stations will attempt to transmit in response to the sensed deassertion of the receive carrier on the media and after the IPG interval, possibly resulting in a collision. Hence, the transmitting station will monitor the media to determine if there has been a collision due to another station sending data at the same time. If a collision is detected, both stations stop, wait a random amount of time, and retry transmission.

The 10/100 Mb/s network stations 14 that operate in full duplex mode send and receive data packets according to the Ethernet standard IEEE 802.3u. The full-duplex environment provides a two-way, point-to-point communication link enabling simultaneous transmission and reception of data packets between each link partner, i.e., the 10/100 Mb/s network station 14 and the corresponding multiport switch 12.

Each multiport switch 12 is coupled to 10/100 physical layer (PHY) transitives 16 configured for sending and receiving data packets to and from the corresponding multiport switch 12 across a corresponding reduced media independent interface (RMHl) 18. In particular, each 10/100 PHY transceiver 16 is configured for sending and receiving data packets between the multiport switch 12 and up to four (4) network stations 14 via the RMII 18. A magnetic transformer 19 provides AC coupling between the PHY transceiver 16 and the corresponding network medium 17. Hence, the RMII 18 operates at a data rate sufficient to enable simultaneous transmission and reception of data packets by each of the network stations 14 to the corresponding PHY transceiver 16.

Each multiport switch 12 also includes an expansion port 30 for transferring data between other switches according to a prescribed protocol. Each expansion port 30 enables multiple multiport switches 12 to be cascaded together as a separate backbone network.

Figure 2:
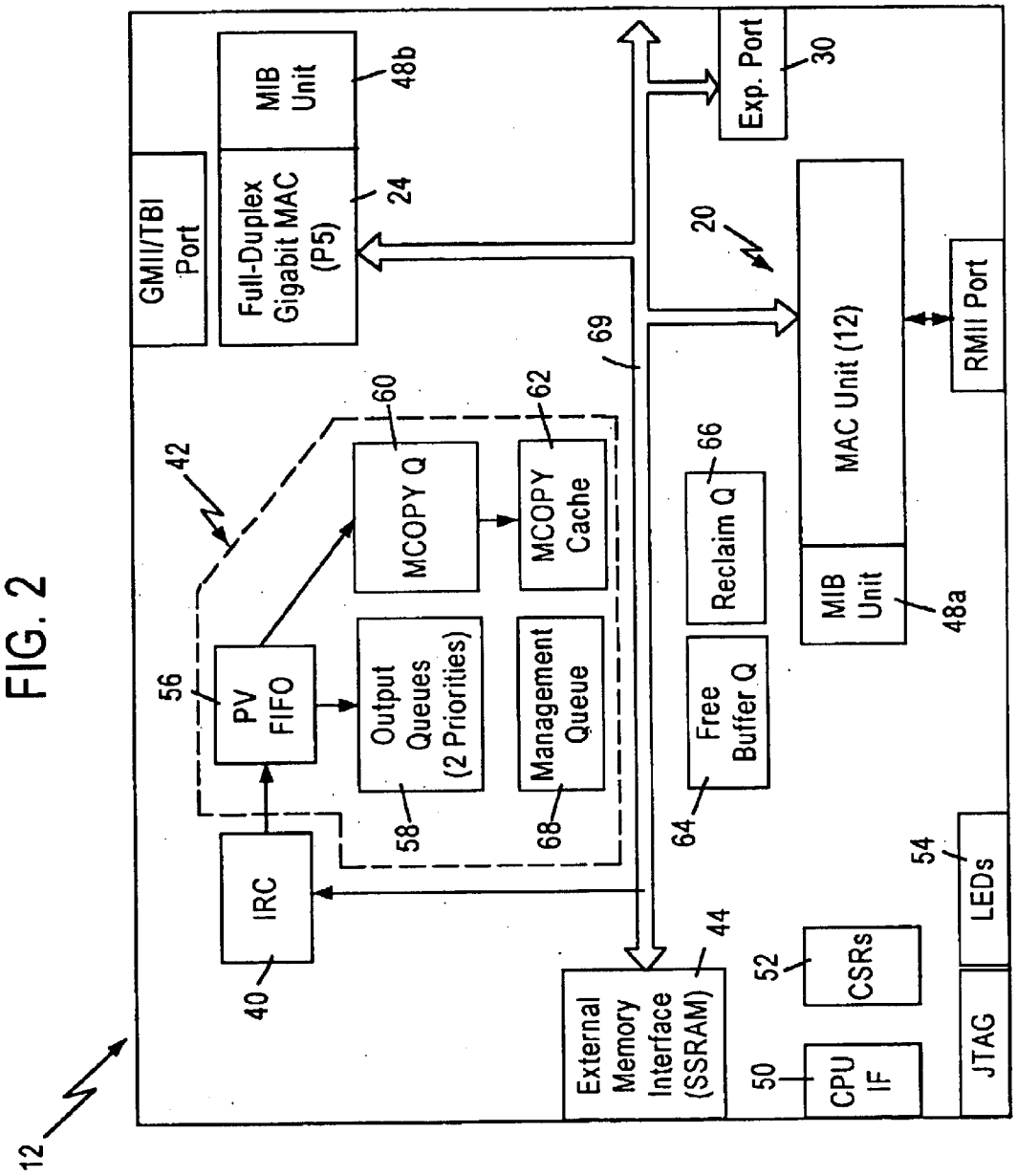
FIG. 2 is a block diagram of the multiple port switch of FIG. 1.

FIG. 2 is a block diagram of the multiport switch 12. The multiport switch 12 contains a decision making engine 40 that performs frame forwarding decisions, a switching subsystem 42 for transferring frame data according to the fratme forwarding decisions, an external memory interface 44, management information base (MIB) counters 48a and 48b (collectively 48), and MAC (media access control) protocol interfaces 20 and 24 to support the routing of data packets between the Ethernet (IEEE 802.3) ports serving the network stations 14 and the gigabit node 22. The MIB counters 48 provide statistical network information in the form of management information base (MIB) objects, to an external management entity controlled by a host CPU 32, described below.

The external memory interface 44 enables external storage of packet data in an external memory 36 such as, for example, a synchronous static random access memory (SSRAM), in order to minimize the chip size of the multiport switch 12. In particular, the multiport switch 12 uses the external memory 36 for storage of received frame data and memory structures. The external memory 36 is preferably either a Joint Electron Device Engineering Council (JEDEC) pipelined burst or Zero Bus Turnaround™ (ZBT)-SSRAM having a 64-bit wide data path and a 17-bit wide address path. The external memory 36 is addressable as upper and lower banks of 128K in 64-bit words. The size of the external memory 36 is preferably at least 1 Mbytes, with data transfers possible on every clock cycle through pipelining. Additionally the external memory interface clock operates at clock frequencies of at least 66 MHz, and, preferably, 100 MHz and above.

The multiport switch 12 also includes a processing interface 50 that enables an external management entity such as a host CPU 32 to control overall operations of the multiport switch 12. In particular, the processing interface 50 decodes CPU accesses within a prescribed register access space, and reads and writes configuration and status values to and from configuration and status registers 52.

The internal decision making engine 40, referred to as an internal rules checker (IRC), makes frame forwarding decisions for data packets received.

The multiport switch 12 also includes an LED interface 54 that clocks out the status of conditions per port and drives an external LED logic. The external LED logic drives LED display elements that are human readable.

The switching subsystem 42, configured for implementing the frame forwarding decisions of the IRC 40, includes a port vector first in first out (FIFO) buffer 56, a plurality of output queues 58, a multicopy queue 60, a multicopy cache 62, a free buffer queue 64, and a reclaim queue 66.

The MAC unit 20 includes modules for each port, each module including a MAC receive portion, a receive FIFO buffer, a transmit FIFO buffer, and a MAC transmit portion. Data packets from a network station 14 are received by the corresponding MAC port and stored in the corresponding receive FIFO. The MAC unit 20 obtains a free buffer location (i.e., a frame pointer) from the free buffer queue 64, and outputs the received data packet from the corresponding receive FIFO to the external memory interface 44 for storage in the external memory 36 at the location specified by the frame pointer.

The IRC 40 monitors (i.e., "snoops") the data bus to determine the frame pointer value and the header information of the received packet (including source, destination, and VLAN address information). The IRC 40 uses the header information to determine which MAC ports will output the data frame stored at the location specified by the frame pointer. The decision making engine (i.e., the IRC 40) may thus determine that a given data frame should be output by either a single port, multiple ports, all ports (i.e., broadcast) or no ports (i.e., discarded). For example, each data frame includes a header having source and destination address, where the decision making engine 40 may identify the appropriate output MAC port based upon the destination address. Alternatively, the destination address may correspond to a virtual address that the appropriate decision making engine identifies as corresponding to a plurality of network stations. In addition, the frame may include a VLAN tag header that identifies the frame as information destined to one or more members of a prescribed group of stations. The IRC 40 may also determine that the received data packet should be transferred to another multiport switch 12 via the expansion port 30. Hence, the internal rules checker 40 will decide whether a frame temporarily stored in the external memory 36 should be output to a single MAC port or multiple MAC ports.

The internal rules checker 40 outputs a forwarding decision to the switch subsystem 42 in the form of a forwarding descriptor. The forwarding descriptor includes a priority class identifying whether the frame is high priority or low priority, a port vector identifying each MAC port that should transmit the data frame, receive port number, an untagged set, VLAN information, vector identifying each MAC port that should include VLAN information during transmission, opcode, and frame pointer. The format of the forwarding descriptor will discussed further with respect to FIG. 7. The port vector identifies the MAC ports to receive the data frame for transmission (e.g., 10/100 MAC ports 1–12, Gigabit MAC port, and/or Expansion port). The port vector FIFO 56 decodes the forwarding descriptor including the port vector, and supplies the frame pointer to the appropriate output queues 58 that correspond to the output MAC ports to receive the data frame transmission. In other words, the port vector FIFO 56 supplies the frame pointer on a per-port basis. The output queues 58 give the frame pointer to a dequeuing block 76 (shown in FIG. 3) which fetches the data frame identified in the port vector from the external memory 36 via the external memory interface 44, and supply the retrieved data frame to the appropriate transmit FIFO of the identified ports. If a data frame is to be supplied to a management agent, the frame pointer is also supplied to a management queue 68, which can be processed by the host CPU 32 via the CPU interface 50.

The multicopy queue 60 and the multicopy cache 62 keep track of the number of copies of the data frame that are transmitted from the respective ports, ensuring that the data frame is not overwritten in the external memory 36 until the appropriate number of copies of the data frame have been output from the external memory 36. Once the number of copies output corresponds to the number of ports specified in the port vector FIFO 56, the frame pointer is forwarded to the reclaim queue 66. The reclaim queue 66 stores frame pointers that need to be reclaimed and walks the linked list chain to return the buffers to the free buffer queue 64 as free pointers. After being returned to the free buffer queue 64, the frame pointer is available for reuse by the MAC unit 20 or the gigabit MAC unit 24.

Figure 3B:
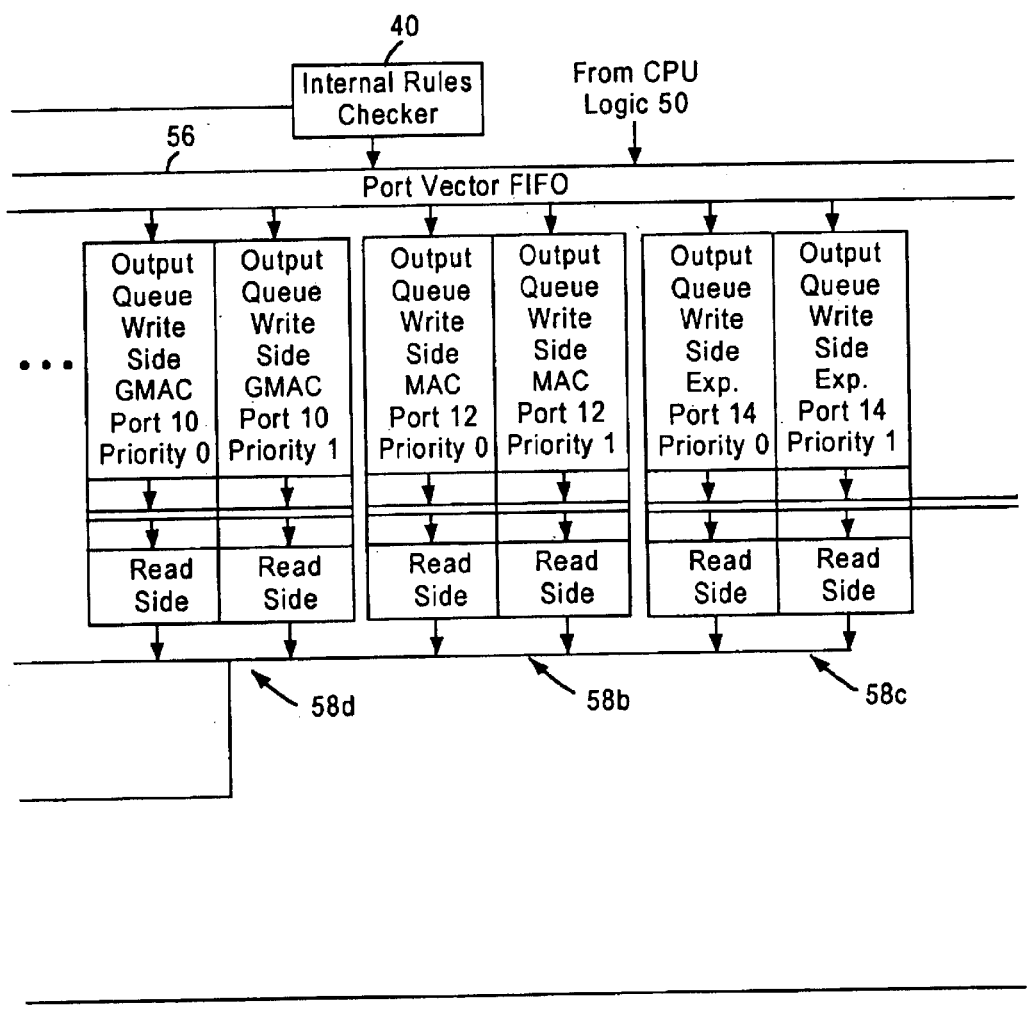
FIG. 3 is a block diagram illustrating in detail the switching subsystem of FIG. 2.
Figure 3C:
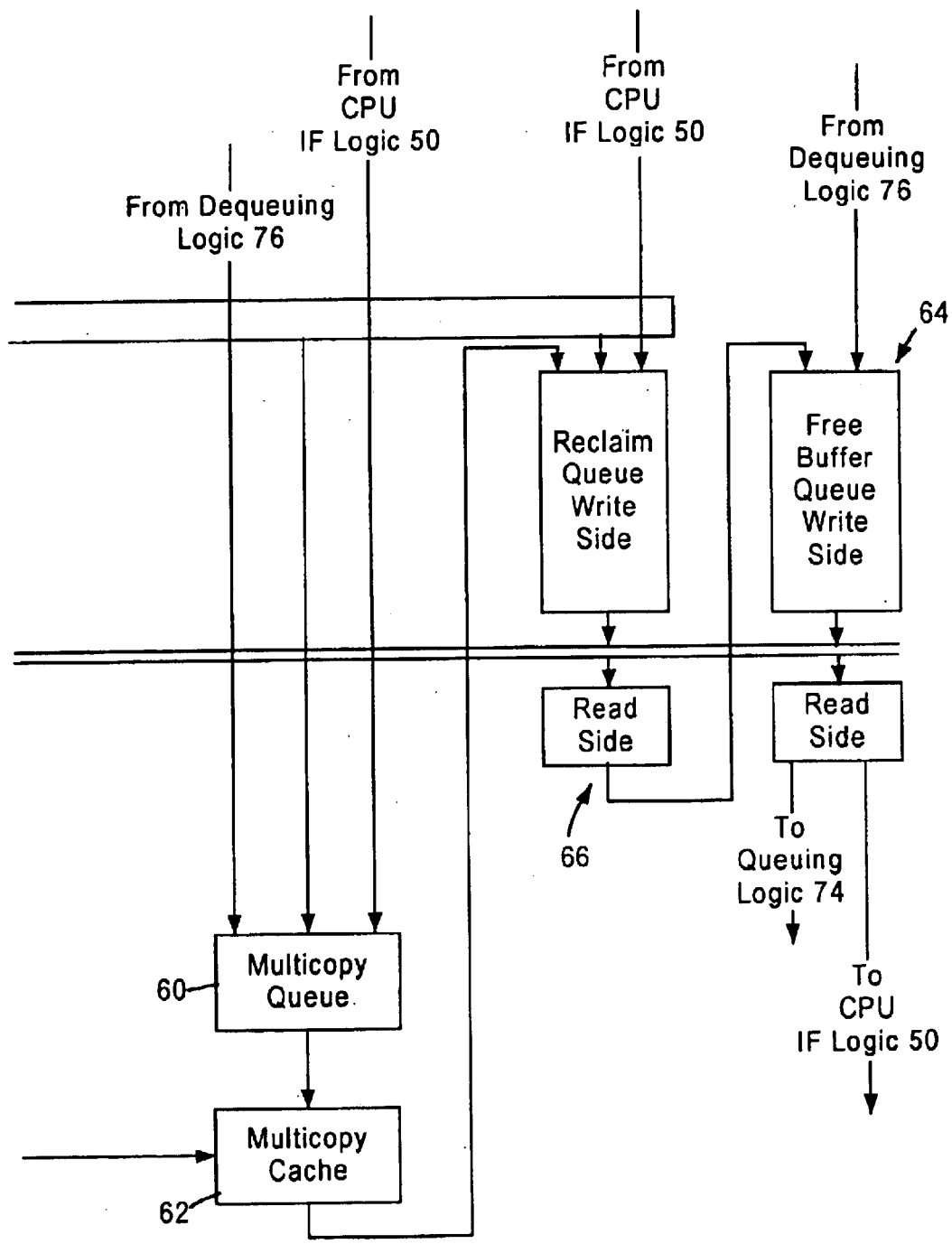

FIG. 3 depicts the switch subsystem 42 of FIG. 2 in more detail according to an exemplary embodiment of the present invention. Other elements of the multiport switch 12 of FIG. 2 are reproduced in FIG. 3 to illustrate the connections of the switch subsystem 42 to these other elements.

As shown in FIG. 3, the MAC module 20 includes a receive portion 20a and a transmit portion 24b. The receive portion 20a and the transmit portion 24b each include 12 MAC modules (only two of each shown and referenced by numerals 70a, 70b, 70c, and 70d) configured for performing the corresponding receive or transmit function according to IEEE 802.3 protocol. The MAC modules 70c and 70d perform the transmit MAC operations for the 10/100 Mb/s switch ports complementary to modules 70a and 70b, respectively.

The gigabit MAC port 24 also includes a receive portion 24a and a transmit portion 24b, while the expansion port 30 similarly includes a receive portion 30a and a transmit portion 30b. The gigabit MAC port 24 and the expansion port 30 also have receive MAC modules 72a and 72b optimized for the respective ports. The transmit portions 24b and 30b of the gigabit MAC port 24 and the expansion port 30a also have transmit MAC modules 72c and 72d, respectively. The MAC modules are configured for full-duplex operation on the corresponding port, and the gigabit MAC modules 72a and 72c are configured in accordance with the Gigabit Proposed Standard IEEE Draft P802.3z.

Each of the receive MAC modules 70a, 70b, 72a, and 72b include queuing logic 74 for transfer of received data from the corresponding internal receive FIFO to the external memory 36 and the rules checker 40. Each of the transmit MAC modules 70c, 70d, 72c, and 72d includes a dequeuing logic 76 for transferring data from the external memory 36 to the corresponding internal transmit FIFO, and a queuing logic 74 for fetching frame pointers from the free buffer queue 64. The queuing logic 74 uses the fetched frame pointers to store receive data to the external memory 36 via the external memory interface controller 44. The frame buffer pointer specifies the location in the external memory 36 where the received data frame will be stored by the receive FIFO.

The external memory interface 44 includes a scheduler 80 for controlling memory access by the queuing logic 74 or dequeuing logic 76 of any switch port to the external memory 36, and an SSRAM interface 78 for performing the read and write operations with the external memory 36. In particular, the multiport switch 12 is configured to operate as a non-blocking switch, where network data is received and output from the switch ports at the respective wire rates of 10, 100, or 1000 Mb/s. Hence, the scheduler 80 controls the access by different ports to optimize usage of the bandwidth of the external memory 36.

Each receive MAC stores a portion of a frame in an internal FIFO upon reception from the corresponding switch port; the size of the FIFO is sufficient to store the frame data that arrives between scheduler time slots. The corresponding queuing logic 74 obtains a frame pointer and sends a write request to the external memory interface 44. The scheduler 80 schedules the write request with other write requests from the queuing logic 74 or any read requests from the dequeuing logic 76, and generates a grant for the requesting queuing logic 74 (or the dequeuing logic 76) to initiate a transfer at the scheduled event (i.e., slot). Sixty-four bits of frame data is then transferred over a write data bus 69a from the receive FIFO to the external memory 36 in a direct memory access (DMA) transaction during the assigned slot. The frame data is stored in the location pointed to by the buffer pointer obtained from the free buffer pool 64, although a number of other buffers may be used to store data frames, as will be described.

The rules checker 40 also receives the frame pointer and the header information (including source address, destination address, VLAN tag information, etc.) by monitoring (i.e., snooping) the DMA write transfer on the write data bus 69a. The rules checker 40 uses the header information to make the forwarding decision and generate a forwarding instruction in the form of a forwarding descriptor that includes a port vector. The port vector has a bit set for each output port to which the frame should be forwarded. If the received frame is a unicopy frame, only one bit is set in the port vector generated by the rules checker 40. The single bit that is set in the port vector corresponds to a particular one of the ports.

The rules checker 40 outputs the forwarding descriptor including the port vector and the frame pointer into the port vector FIFO 56. The port vector is examined by the port vector FIFO 56 to determine which particular output queue should receive the associated frame pointer. The port vector FIFO 56 places the frame pointer into the top of the appropriate queue 58 and/or 68. This queues the transmission of the frame.

As shown in FIG. 3, each of the transmit MAC units 70c, 70d, 72d, and 72c has an associated output queue 58a, 58b, 58c, and 58d, respectively. In preferred embodiments, each of the output queues 58 has a high priority queue for high priority frames, and a low priority queue for low priority frames. The high priority frames are used for frames that require a guaranteed access latency, e.g., frames for multimedia applications or management MAC frames. The frame pointers stored in the FIFO-type output queues 58 are processed by the dequeuing logic 76 for the respective transmit MAC units. At some point in time, the frame pointer reaches the bottom of an output queue 58, for example, output queue 58d for the gigabit transmit MAC 72c. The dequeuing logic 76 for the transmit gigabit port 24b takes the frame pointer from the corresponding gigabit port output queue 58d, and issues a request to the scheduler 80 to read the frame data from the external memory 36 at the memory location specified by the frame pointer. The scheduler 80 schedules the request, and issues a grant for the dequeuing logic 76 of the transmit gigabit port 24b to initiate a DMA read. In response to the grant, the dequeuing logic 76 reads the frame data (along the read bus 69b) in a DMA transaction from the location in external memory 36 pointed to by the frame pointer, and stores the frame data in the internal transmit FIFO for transmission by the transmit gigabit MAC 72c. If the forwarding descriptor specifies a unicopy transmission, the frame pointer is returned to the free buffer queue 64 following writing the entire frame data into the transmit FIFO.

A multicopy transmission is similar to the unicopy transmission, except that the port vector has multiple bits set, designating the multiple ports from which the data frame will be transmitted. The frame pointer is placed into each of the appropriate output queues 58 and transmitted by the appropriate transmit MAC units 20b, 24b, and/or 30b.

The free buffer pool 64, the multicopy queue 60, the reclaim queue 66, and the multicopy cache 62 are used to manage use of frame pointers and re-use of frame pointers once the data frame has been transmitted to its designated output port(s). In particular, the dequeuing logic 76 passes frame pointers for unicopy frames to the free buffer queue 64 after the buffer contents have been copied to the appropriate transmit FIFO.

For multicopy frames, the port vector FIFO 56 supplies multiple copies of the same frame pointer to more than one output queue 58, each frame pointer having a unicopy bit set to zero. The port vector FIFO 56 also copies the frame pointer and the copy count to the multicopy queue 60. The multicopy queue 60 writes the copy count to the multicopy cache 62. The multicopy cache 62 is a random access memory having a single copy count for each buffer in external memory 36 (i.e., each frame pointer).

Once the dequeuing logic 76 retrieves the frame data for a particular output port based on a fetched frame pointer and stores the frame data in the transmit FIFO, the dequeuing logic 76 checks if the unicopy bit is set to 1. If the unicopy bit is set to 1, the frame pointer is returned to the free buffer queue 64. If the unicopy bit is set to zero indicating a multicopy frame pointer, the dequeuing logic 76 writes the frame pointer with a copy count of minus one (−1) to the multicopy queue 60. The multicopy queue 60 adds the copy count to the entry stored in the multicopy cache 62.

When the copy count in multicopy cache 62 for the frame pointer reaches zero, the frame pointer is passed to the reclaim queue 66. Since a plurality of frame pointers may be used to store a single data frame in multiple buffer memory locations, the frame pointers are referenced to each other to form a linked-list (i.e., chain) of frame pointers to identify the stored data frame in its entirety. The reclaim queue 66 traverses the chain of buffer locations identified by the frame pointers, and passes the frame pointers to the free buffer queue 64.

The foregoing description of the switch architecture provides an overview of the switch operations in a packet switched network. A more detailed description of the features of the present invention as embodied in the multiport switch 12 will now be provided. First, the architecture of an exemplary expansion port 30 will be discussed, followed by the details for transferring data between switches 12.

Pipelined State Machines

The present invention is directed to a network switch with a pipelined architecture that enables high data throughput. In particular, the switch is logically constructed of various state machines that operate concurrently to process a data frame. These state machines are responsible for ingress and egress processing functions within the switch 12.

As previously indicated with respect to FIG. 3, the IRC 40 is responsible for making frame forwarding decisions, in part, by generating a forwarding descriptor. Towards this end, the IRC 40 contains an address table for MAC addresses (which may be unicast, multicast or broadcast), along with VLAN associations and port vectors. Upon receipt of a frame from one of its input ports, the IRC 40 searches the address table for matching MAC addresses and learns the network configuration based upon a MAC source address (SA) with receive port number and VLAN lookup. The forwarding decision is then made according to the destination address (DA) and the VLAN association, resulting ultimately in the output of a forwarding descriptor. The IRC 40 passes the generated forwarding descriptor that includes the frame type and an operational code (opcode) to PVF 56 (FIG. 3). The PVF 56 is responsible for creating a new opcode that instructs the dequeuing logic 76 to add, remove, modify the VLAN tag, or send the frame unmodified. VLANs provide "broadcast domains" whereby broadcast traffic is kept "inside" the VLAN. For example, a specific VLAN may contain a group of users at a high level of an organization. When sending data to this group of users, the data may include a specific VLAN identifier associated with this particular group to ensure that only these users receive the data.

Figure 4A:
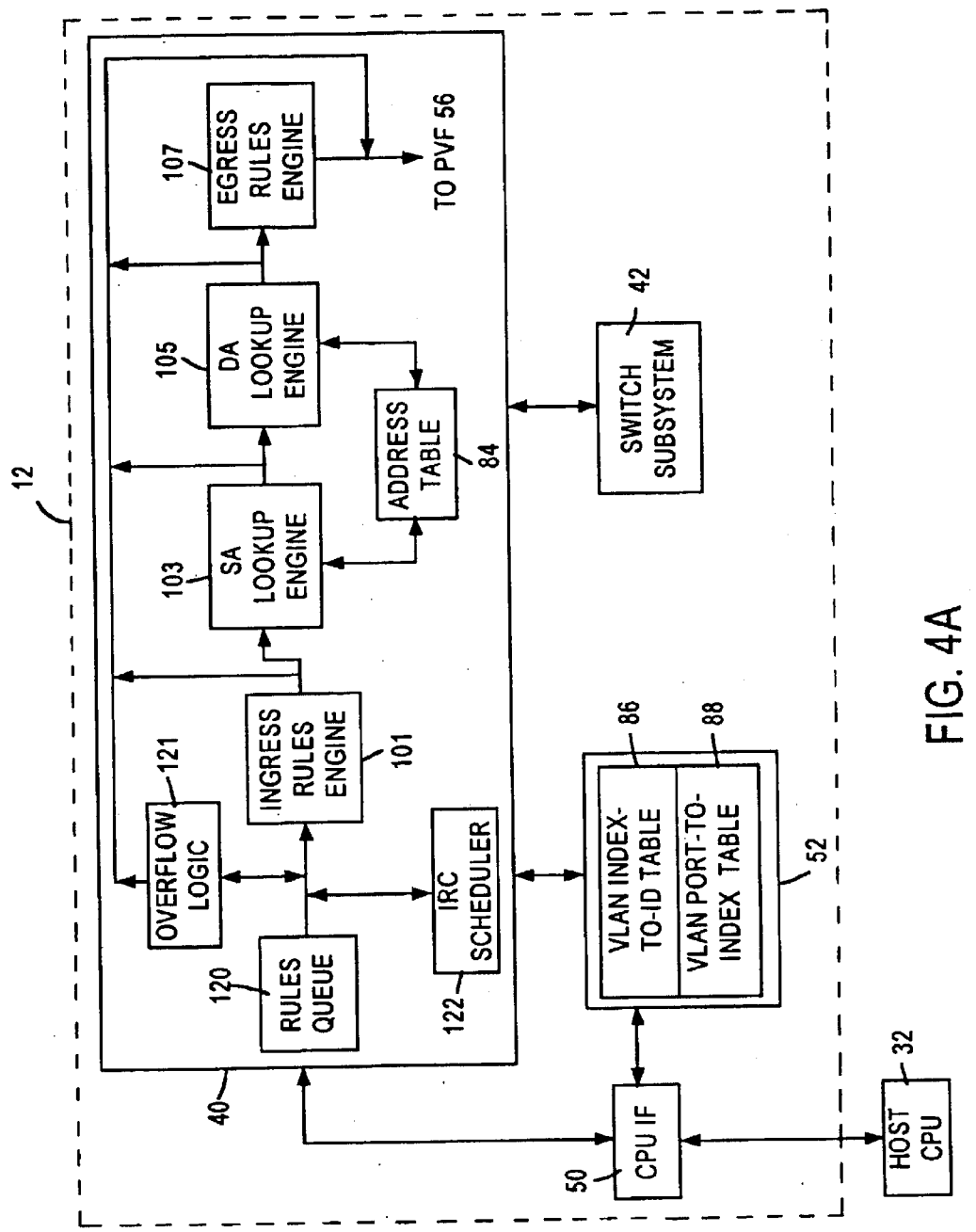
FIG. 4A is a block diagram of a system including the internal rules checker (IRC) of FIG. 2 in accordance with an embodiment of the present invention.

According to the exemplary embodiment of the invention illustrated in FIG. 4A, the IRC 40 includes four functional logic blocks, namely an ingress rules engine 101, a source address (SA) lookup engine 103, a destination address (DA) lookup engine 105, and an egress rules engine 107. These logic blocks 101, 103, 105, and 107 operate individually as state machines, as later discussed with respect to FIGS. 4B and 4C. In the exemplary embodiment, the four engines 101, 103, 105, and 107 are employed as separate logic devices. In other words, each engine is designed in a modular fashion to receive input from other devices and to perform its particular functions without relying on processing logic from another logic engine. Advantageously, this modular architecture allows changes to be made to any of the particular logic engines without affecting other parts of the decision making process. However, in alternative configurations, the individual functions performed by each logic engine, discussed in detail below, as well as the particular number of logic engines may be modified, based on the particular network requirements.

The IRC 40 also includes address table 84 for storing VLAN information and user MAC addresses. In alternative embodiments, the address table 84 may be located outside the IRC 40 within another part of the multiport switch 12 or even external to the multiport switch 12. However, in the exemplary embodiment, the address table 84 is located within the IRC 40 and is coupled to the SA lookup engine 103 and the DA lookup engine 105. However, the number of addresses and VLANs supported may be increased by expanding the table size.

As shown in FIG. 4A, the host CPU 32 functions as the management entity and is connected to the IRC 40 via the CPU interface (IF) 50. Alternatively, a management MAC may be connected to the CPU IF 50 to function as the management entity. The CPU IF 50 allows the host CPU 32, among other functions, to directly access the configuration and status registers 52 and permits communication between the IRC 40 and the host CPU 32. The host CPU 32 is responsible for initializing the values in the address table 84. The IRC 40 uses the specific fields of the address table 84 to make frame forwarding decisions when frames are received in the switch 12. More specifically, the DA lookup engine 105 searches the address table 84 for frame forwarding information. From the information found in the address table 84, the IRC 40 creates a forwarding descriptor, which includes the frame pointer, the port vector, the receive port number, the VLAN identifier (ID), the priority class and a control opcode. An exemplary format of the forwarding descriptor is described in FIG. 6. The IRC 40 then transmits the forwarding port vector to the descriptor FIFO 56 for queuing, as shown in FIG. 3. It should be noted that the host CPU 32 can likewise send forwarding descriptors to the port vector FIFO 56; such forwarding descriptors are unaltered by the IRC 40.

The host CPU 32 is also responsible for programming the 64 12-bit VLAN IDs in the VLAN index to VLAN ID table 86. The host CPU 32 may also assign a port-based VLAN ID to each port. Accordingly, the CPU 32 must program the VLAN Port-to-Index table 88. The IRC 40 uses VLAN Port-to-Index table 88 to assign a VLAN ID to a frame that is received without a VLAN tag.

The VLAN index field is a 6-bit field used to reference a 12-bit VLAN ID. A VLAN index-to-VLAN ID table 86, shown in FIG. 4A, contains the mapping associations. The switch 12 receives both tagged and untagged frames. When the switch 12 receives untagged data frames, i.e., without VLAN tag information, the IRC 40 assigns a VLAN index from a VLAN port-to-index table 88, based on the receive port on which the frame is received. The VLAN index-to-ID table 86 and the VLAN port-to-index table 88 are located with the configuration and status registers 52. However, in alternative configurations, the tables 86 and 88 may be located within the IRC 40.

According to the exemplary embodiment, the IRC 40 also includes a logically separate 4-deep rules queue 120 allocated for each receive port, i.e., the queue corresponding to each receive port holds four frame headers. However, in alternative configurations, the rules queue 120 may be configured to store other numbers of frame headers for each port, based on the particular network requirements. The rules queue 120 "snoops" on the write bus 69 to (see FIG. 3) external memory 36 to capture the first 40 bytes of frame data transferred by queuing logic 74 to the buffers in external memory 36. When a frame has been completely transferred to external memory 36, the queuing logic 74 signals the end of the transfer and provides frame status information indicating whether the frame was received at the switch 12 without errors.

The IRC 40 also includes IRC scheduler 122, which monitors the signaling from queuing logic 74 and stores the frame status information in the rules queue 120 along with the corresponding frame header. When the end of frame (EOF) transfer has been signaled by the queuing logic 74, the IRC scheduler 122 enables the processing of the frame header through the ingress rules engine 101. Logic engines 101, 103, 105, and 107, as discussed previously, are separate logic engines and are able to process data frames in parallel, thereby increasing data throughput as compared to systems which employ a single decision making device. In other words, each logic engine is able to perform its respective processing on a different data frame simultaneously with the other respective logic engines. Advantageously, the data throughput of the multiport switch 12 including engines 101, 103, 105, and 107 may increase up to fourfold, as compared to a network switch that employs a single decision making device, since four data frames may be processed simultaneously. The operation of each logic engine, according to the exemplary embodiment, will be described below.

When an overflow state of any of the rules queues 120 is detected by the IRC 40, overflow logic 121 allows frame pointers to bypass engines 101, 103, 105, and 107. The overflow logic 121 comprises multiple overflow registers (not shown in detail) that are allocated to different receive ports of the switch 12. For example, overflow registers, designated as registers 1 to 12, may be provided to support 10/100 MAC ports 1–12; overflow register 13 may be arranged for frame pointers associated with data received via the gigabit MAC port 24. Further, overflow register 14 may be assigned to the expansion port 30. Each of the entries in the overflow registers capable of storing a single 13-bit frame pointer associated with data received via the corresponding receive port. The IRC 40, thus, outputs an overflow (OVFL) descriptor to the PV FIFO 56 based upon the frame pointers that bypassed the engines 101, 103, 105, and 107.

The ingress rules engine 101 performs a variety of preprocessing functions for each frame header. For example, ingress rules engine 101 checks to see if a data frame was received with errors by reading the frame status information stored with the respective frame headers in rules queue 120. When the ingress rules engine 101 determines that a receive error has occurred, the ingress rules engine 101 constructs a forwarding descriptor with a null port vector, e.g., a port vector with all zeros or some other predetermined value, that will cause the frame to be discarded. Optionally, frames with errors may be forwarded to the host CPU 32 for diagnostic purposes. However, in either case, the ingress rules engine 101 transmits the forwarding descriptor with the null port vector directly to the port vector FIFO 56, without processing by engines 103, 105 and 107. This saves processing time associated with performing searches of the address table 84 for a data frame that contains erroneous data.

The ingress rules engine 101 also checks the destination address (DA) of the frame to determine if the frame should be sent to the management entity, e.g., host CPU 32. Specifically, the ingress rules engine 101 looks for Bridge Protocol Data Units (BPDUs), Generic Attribute Registrations Protocol (GARP) frames, MAC Control Frames and frames with certain Physical MAC addresses. The ingress rules engine 101 identifies these types of frames based on their specific DA information. When the ingress rules engine 101 detects a match with one of the above DAs, the ingress rules engine 101 constructs a forwarding descriptor identifying the management port. The ingress rules engine 101 then transmits the forwarding descriptor directly to the port vector FIFO 56, bypassing engines 103, 105, and 107.

If the SA lookup engine 103 finds an address entry whose address and VLAN index match the SA and VLAN index of the frame header, the SA lookup engine 103 sets a bit ("hit bit") within the address entry that is used in conjunction with an aging algorithm. This mechanism allows for the deletion of "old" address entries. If the SA lookup engine 103 does not find a match and learning is enabled, the SA lookup engine 103 constructs a new entry in the IRC address table 84 using the information from the received frame.

After the SA lookup engine 103 completes the search and adds a new entry, if necessary, the DA lookup engine 105 performs a search of the address table 84. The DA lookup engine 105 searches the address table 84 for an address entry whose address and VLAN index match the destination address (DA) and VLAN index of the frame. The DA lookup engine 105, in an exemplary embodiment, uses a 12-bit hash function circuit (not shown) to generate a 12-bit hash key for the DANVLAN index search. The hash function is more fully described below in the discussion of FIG. 4B. If a match is found, the DA lookup engine 105 uses the port vector field of the address entry and passes the port vector field information to the egress rules engine 107. When the DA lookup engine 105 cannot find a DA/VLAN index match, the frame must be "flooded" to all members of the VLAN. In this case, the DA lookup engine 105 sets the port vector to indicate that all member ports are to transmit the frame. The port vector field is a 15-bit field that identifies each port(s) that should receive the data frame for transmission to its destination address. Bit 0 of the port vector field corresponds to Port 0 (the management port), bits 1–12 correspond to MAC ports 1–12 respectively (the 10/100 Mb/s ports), bit 13 corresponds to the gigabit port 24 and bit 14 corresponds to the expansion port 30.

Figure 4B:
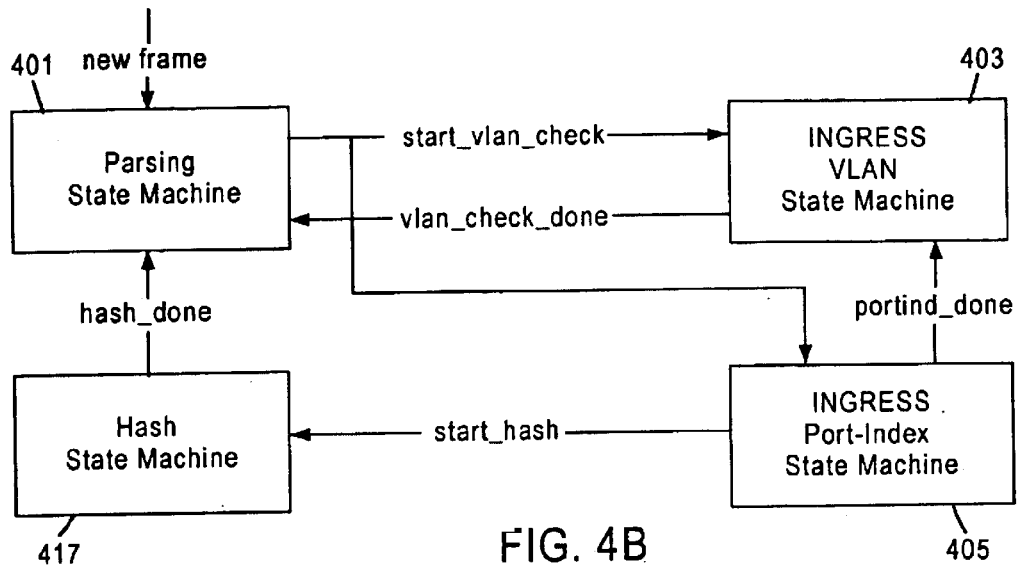
FIG. 4B is a block diagram showing the interaction between state machines associated with the ingress process according to an embodiment of the present invention.

As discussed earlier, the switch 12 performs ingress and egress processing functions through the internal rules checker 40. The architecture of this rules checker logic 40 is implemented using pipelined state machines, which utilize one or more of the logic engines 101, 103, 105, and 107. Ingress processing is performed by four ingress state machines, as shown in FIG. 4B. The parsing state machine 401 receives a frame, more precisely the frame header, from the rules queue 120 and examines it for various conditions. Initially, parsing state machine 401 extracts the source address and also determines if the frame contains errors (e.g., CRC error or overflow). This state machine 401 supplies information extracted or derived from the frame header to the Ingress VLAN state machine 403 and the Ingress Port-Index state machine 405; these state machines 401 and 403 do not directly receive the frame header. Upon detection of error, the parsing state machine 401 ceases further processing of the frame.

The parsing state machine 401 parses the frame header to check data frame type. In one embodiment, the parsing state machine 401 expressly determines whether the frame is an IGMP (Internet Group Management Protocol) frame. This protocol provides Internet protocol (IP) hosts with a capability to report their multicast group membership information to other internetworking devices, such as multicast routers. IGMP is a standard for TCP/IP hosts and is a protocol for participating in IP multicasts. The identification of an IGMP frame by the parsing state machine 401 is more fully described below in the discussion of FIG. 7.

The parsing state machine 401 triggers processing of the frame by the Ingress VLAN state machine 403 and the Ingress Port-Index state machine 405 through the start_vlan_check (i.e., VLAN check) signal. These two state machines 401 and 403 operate concurrently. The Ingress VLAN state machine 403 processes data frames based upon VLAN types. Specifically, the Ingress VLAN state machine 403 handles those data frames with the following VLAN types: VLAN tagged or priority-tagged. A priority-tagged frame possesses a VLAN ID equal to zero. The state machine 403 determines the VLAN index from the VLAN ID using the VLAN Index-to-ID table 86. In the case of a priority tagged or untagged VLAN type frame, the Ingress VLAN state machine 403 waits for the Ingress Port-Index state machine 405 to supply it with an appropriate VLAN index. The Ingress Port-Index state machine 405 supplies this information to the Ingress VLAN state machine 403 with a portind_done signal (i.e., port-index done acknowledgement signal). If the VLAN is unknown or the ingress check has failed, the Ingress VLAN state machine 403 generates an opcode indicating that the VLAN tag header is unknown or the data frame was received in error. Upon determining the proper VLAN index, the Ingress VLAN state machine 403 informs the Parsing state machine 401 that it has completed processing by issuing a vlan_check_done signal (i.e., VLAN check done).

The Ingress Port-Index state machine 405 obtains a VLAN index value based in part upon whether the received data frame is VLAN tagged or untagged. A VLAN tagged frame has a VLAN tag header with a non-zero VLAN ID. An untagged frame, on the other hand, does not have a VLAN tag header. If the frame is untagged, the Ingress Port-Index state machine 405 searches the VLAN Port-to-Index Table 88 to find a default VLAN index value for the data frame; this VLAN index value is then used during the SA look-up process to learn source addresses. Another function of the Ingress Port-Index state machine 405 is execution of the ingress rules check to filter the data frame if it has been received with errors or if the data frame does not belong to one of the VLANs associated with the receiving port. The Ingress Port-Index state machine 405 starts the Hash state machine 407 by sending a hash signal (start_hash). It is crucial that the Hash state machine 407 finish processing before a proper VLAN index is determined by the Ingress Port-Index state machine 405. Such is the case, because the Ingress VLAN state machine 403 relies on the input of the Ingress Port-Index state machine 405 for the scenario whereby the frame is priority tagged or untagged.

Accordingly, the Hash state machine 407 waits for the Ingress Port-Index state machine 405 to output the hash signal before beginning to generate a hash key. The Hash state machine 407 generates two separate hash keys based respectively upon the following: (1) the SA and the VLAN index, or (2) the DA and the VLAN index. This state machine 407 uses the source address of the data frame according to a user-specified hash function. Initially, a search key is created by concatenating the 16 least significant bits of the source address of the data packet with the VLAN index. The SA lookup engine 103 performs hash searches of the IRC address table 84 to find entries associated with the source address and VLAN index of a received data frame. A user-specified hash function, stored in a user-programmable register (HASHPOLY) (not shown), includes a 12-bit value defining the hash polynomial used by the Hash state machine 407. The HASHPOLY is based on the particular design requirements. After the entire search key has been processed, the Hash state machine outputs a 12-bit hash key and sends a hash done signal (hash_done) to the parsing state machine 401.

Figure 4C:
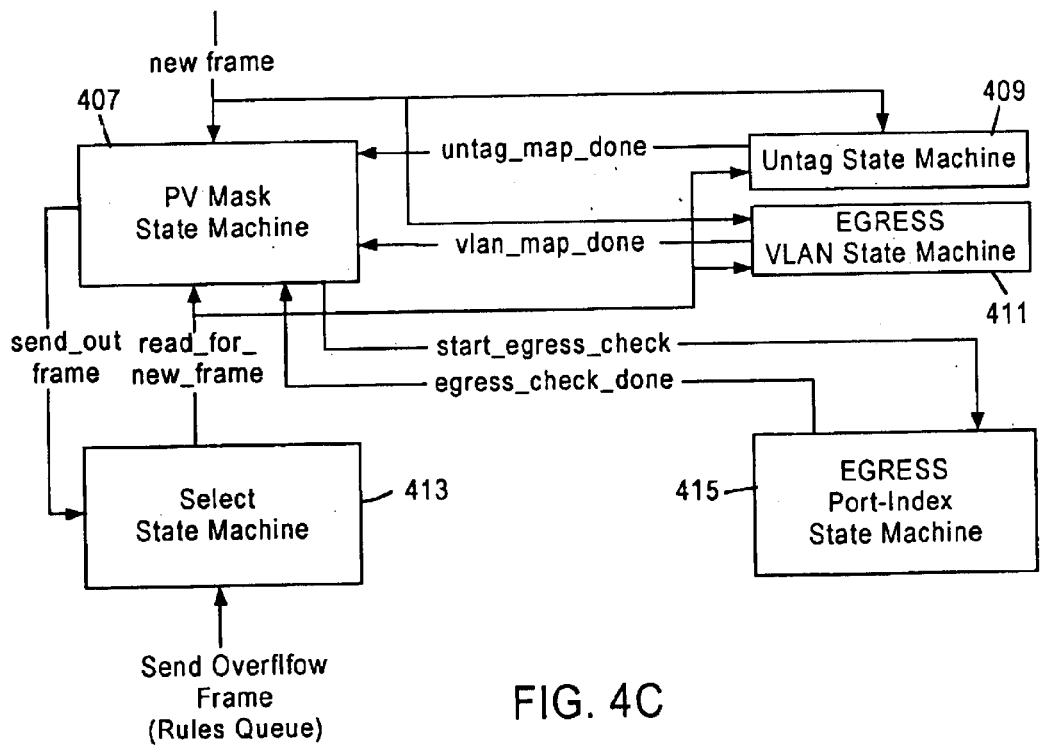
FIG. 4C is a block diagram showing the interaction between state machines associated with the egress process according to an embodiment of the present invention.

With respect to the egress functions, as illustrated in FIG. 4C, the IRC 40 utilizes a pipelined architecture to support these functions via the following egress state machines: Port Vector (PV) Mask state machine 417, Untag state machine 409, Egress VLAN state machine 411, Egress Port-Index state machine 415, and Select state machine 413. The frame header enters the PV Mask state machine 417, which modifies a port vector that is output from the DA Lookup engine 105. The Untag state machine 409 and the VLAN state machine 403 also receive the frame header at the same time as the PV Mask state machine 417 does to begin processing. The operation of the PV Mask state machine 417 includes performing a spanning tree check to eliminate blocked ports from the port vector so that the data frame is not sent out these ports. Spanning tree is an algorithm that removes loops in the network for proper operation. The egress rules engine 107 determines which ports are valid "forwarding" ports, conform with the spanning tree algorithm (e.g., IEEE 802.1d). The PV Mask state machine 417 further executes other masking operations, including screening the receive port and cascade port and performing the trunking algorithm. Subsequent to executing the trunking algorithm, the PV Mask state machine 417 sends the Egress Port-Index state machine 415 a start_egress_check (egress check) signal, instructing the Egress Port-Index state machine 415 to execute a VLAN egress rules check. The VLAN egress rules check entails examining whether the VLAN index of the frame corresponds to a VLAN member set table entry such that ports not belonging to the particular VLAN (as indicated by the VLAN index) are masked from the port vector. The above functions of the PV Mask state machine 417 are further discussed with respect to FIG. 5.

While the PV Mask state machine 417 processes the frame, the Untag state machine 409 checks the untagged set table (not shown) to determine whether the data frame is a member of the untagged set. An untagged set is a set of ports in which, if frames belonging to that VLAN are to be transmitted, the frames must be transmitted without VLAN tag headers. That is, ports belonging to the untagged set for a particular VLAN are not associated with that VLAN. Once the Untag state machine 409 completes the check of the untagged set, it notifies the PV Mask state machine 417 via an untag_map_done (untag map done) signal.

The Egress VLAN state machine 411 outputs a VLAN ID based upon the VLAN index of the frame. As part of its processing, the Egress VLAN state machine 411 searches the VLAN Index-to-ID table 86 to match the 6-bit VLAN index of the frame to a corresponding 12-bit VLAN ID. After completing the mapping of VLAN index to VLAN ID, the Egress VLAN state machine 411 informs the PV Mask state machine 417 using the vlan_map_done (VLAN map done) signal. In turn, the PV Mask state machine 417 transmits the send_out_frame (send frame) signal to the Select state machine 413, indicating that the creation of a forwarding descriptor is complete and is ready to be forwarded to the PV FIFO 56.

The Select state machine 413 selects between two types of descriptors: the normal forwarding descriptor from the PV Mask state machine 417 and an overflow descriptor from the Overflow Logic 121. That is, the Select state machine 413 monitors the overflow path for an overflow descriptor. If an overflow descriptor is present, then the Select state machine 413 assigns this descriptor a higher priority than a normal forwarding descriptor, thereby permitting the overflow descriptor to directly route to the PV FIFO 56. Because the PV FIFO 56 can accept descriptors only after a certain time, the Select state machine 413 purposely introduces delay to ensure that the PV FIFO 56 will properly receive the forwarding or overflow descriptor that is sent. In the case where no overflow descriptor exists or had been previously forwarded, the Select state machine 413 proceeds to send the normal forwarding descriptor that has been created by the PV Mask state machine 417 and thereafter notifies the PV Mask state machine 413 using the ready_for_new_frame (new frame) signal.

FIG. 5 shows a flow diagram of the generation of a forwarding descriptor by the IRC 40 according to certain embodiments of the present invention. In general, a port vector undergoes a series of checks that modifies the port vector so that a proper port vector is captured in a forwarding descriptor sent to the PVF 56. That is, the IRC 40 ensures that the data frame is sent out from the proper output ports. As in step 501, a port vector is output from the DA lookup engine 105. As previously discussed, the DA lookup engine 105 outputs the port vector, which reflects where the data frame should be transmitted as dictated by the destination address in the header of the data frame. Thus, the port vector begins at this state and is subsequently modified according to other criteria and parameters associated with the proper forwarding of the data frame. In step 503, the ingress rules engine 101 checks the spanning tree state to determine whether frames received from the port should be filtered. The port vector is accordingly modified to mask out ports that fail the spanning tree check; the port vector is logically "ANDed" with the determined forwarding ports so as to mask the ports that have been blocked. Next, the receiver port, as in step 505, is eliminated from the port vector by masking the received port with the port vector. This masking prevents the scenario whereby a data frame is received at a particular port and is sent out through that same port.

Steps 507 and 509 mask a cascade port (CP) to prevent the data frame from unnecessarily circulating among the cascaded switch module configuration (as shown in FIG. 1). In this scenario, a number of switches 12a, 12b, and 12c are cascaded (FIG. 1) via their respective expansion ports 30. In step 507, IRC 40 checks whether the data frame was received at the cascade port (i.e., expansion port) and that the cascade port belongs to a switch 12c that is "last" in the cascaded loop. If this is so, as in step 509, the port vector is masked with the cascaded port.

Next, the IRC 40 checks whether the port vector conforms with the results of a "trunking" algorithm (step 511). The switch 12 supports up to 3 independent trunks, each of which can consist of two to four ports. The 10/100 Mbs ports are divided into three trunk blocks consisting of ports 1–4, ports 5–8, and ports 9–12. Within each trunk block any two to four adjacent ports can be combined into one trunk. The purpose of trunking is to load balance across the trunk ports. If the DA lookup engine 105 determines that a frame should be transmitted through a port that is part of a trunk, the IRC 40 performs a calculation (the trunk mapping function) on the frame's address fields to determine which of the trunk links to use. This may result in a frame being forwarded through a port that is different from the port indicated by the DA lookup engine 105. If any of the bits that are set in the port vector corresponds to a trunk port, the IRC 40 masks out all bits that correspond to ports in that trunk and then sets the bit corresponding to the port selected by the trunk mapping function. In other words, the IRC 40 masks the port vector to account for redirecting the frame according to the trunking algorithm.

Steps 513, 515, and 517 execute the VLAN egress rules check. In particular, the egress rules engine 107 checks the VLAN member set for each output port. The IRC 40 examines the bit that corresponds to the frame's VLAN index in the VLAN member set table entry that corresponds to the output port, per step 513. If this bit is not set, the IRC 40 accordingly masks that port from the port vector (step 515). This check is performed for every bit that is set in the port vector; as in step 517, the IRC 40 checks whether the bit that is being checked corresponds to the last port in the port vector. Step 517 essentially ensures that the IRC 40 checks every bit of the port vector.

The egress rules engine 107 provides a "sniffer port", which allows a probe connected to a port to monitor network activity on the other ports. Accordingly, steps 517 and 521 account for the sniffer port in the port vector. This sniffer port may be any port within the switch 12. The sniffed ports may be any port except the port associated with management queue 68.

The remaining steps of FIG. 5 involve the generation of the other fields of the forwarding descriptor. In step 523, the IRC 40 maps the VLAN index to the VLAN ID and inserts it into the forwarding descriptor. Next the IRC 40 determines whether an overflow (OVFL) descriptor exists, per step 525. If an OVFL descriptor exists, the IRC 40 immediately sends the OVFL descriptor to the PVF 56, per step 527. Otherwise, the IRC 40 sends the forwarding descriptor to PVF 56 (step 529).

Figure 6:
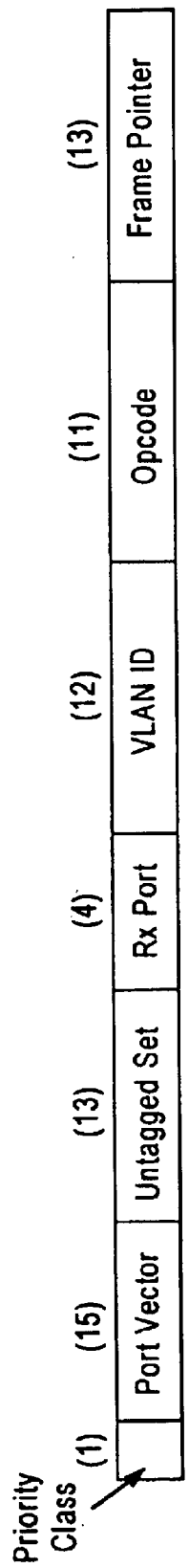
FIG. 6 is a diagram showing the format of the forwarding descriptor according to an embodiment of the present invention.

An exemplary format of a forwarding descriptor is shown in FIG. 6. The first field is a 1-bit priority class field, which indicates priority of the output queues to which the frame pointer should be sent. As previously indicated, the 15-bit port vector field is a bit map that specifies the port or ports designated to transmit the frame. The forwarding descriptor also contains, in one embodiment, a 4-bit receive port field that indicates the particular port within the switch 12 from which the frame was received. Another field includes a 12-bit VLAN ID that is associated with the frame; the dequeuing logic 76 may have to create a VLAN tag header with this identifier. In addition, the forwarding descriptor includes an operation code (opcode) field, which is 11-bits in length. The opcode field contains instructions that are used by the PVF 56 and the dequeuing logic 76 to determine operations that need to be performed on the frame before transmission. The opcode also has information used by management software to determine why a frame was forwarded to the management queue 68. Lastly, the forwarding descriptor has a 13-bit frame pointer field; this field provides the location of the frame in external memory 36.

FIG. 7 shows the operation of the Parsing state machine 401 to determine whether the frame is an IGMP frame. In step 701, the state machine 401 checks the Type/Length field (bytes 13 and 14) of a data frame for a VLAN tag header. If the frame belongs to a VLAN, the Parsing state machine 401 inquires whether the frame is an IEEE 802.3 frame, as in step 703. In the case where the relevant bytes indicate that the frame is not an IEEE 802.3 frame, subsequent bytes of the frame, as in step 705, are compared to bit patterns that are characteristic of an IGMP frame. If these bytes match, then the Parsing state machine 401 has determined that the frame is an IGMP frame; otherwise, the frame is not an IGMP.

Assuming the Parsing state machine 401 has determined that the frame is an IEEE 802.3 frame, per step 703, the state machine 401 examines an appropriate byte to check whether the DSAP (destination service access point) within the frame is an Internet Protocol (IP) access point. If the frame is not an IP access point, the Parsing state machine 401 analyzes the appropriate bytes to check whether the frame is an IP SNAP (subnetwork access protocol) frame (step 711). The Parsing state machine 401 further, as in step 711, inquires whether the frame is an IPv4 frame if the frame was determined to be an IP SNAP frame by comparing the pertinent byte with a known value. If the frame is an IPv4 frame, then other bytes of the frame is compared to predetermined IGMP bit patterns (step 705); a match would indicate that the frame is an IGMP frame. In the case where the frame is neither an IP SNAP nor IPv4 frame as determined by steps 709 and 711, the frame is not an IGMP frame.

In step 713, the Parsing state machine 401 analyzes the Type/Length field to decide whether the frame is an IEEE 802.3 frame. If the frame is an IEEE 802.3 frame, then the Parsing state machine 401 inquires if the DSAP is IP. If the DSAP is IP, the frame is examined to determine whether it is an IPv4 frame (step 711). In the event the frame is such a frame, other bytes of the frame are compared to known IGMP values. Per step 705, a match indicates that the frame is an IGMP frame, while a non-match of any of the bytes signifies that the frame is not an IGMP frame. Alternatively, if step 707 is not true (i.e., the DSAP is not IP), then the Parsing state machine 401 checks if the frame is an IP SNAP (step 709). Should this not be the case, the frame is not an IGMP frame. However, if the frame is of an IP SNAP type, the Parsing state machine 401 then inquires whether the frame is IPv4; if it is not, then the frame is not an IGMP type.

Back in step 713, if it is determined by the Parsing state machine 401 that the Type/Length field is not associated with an IEEE 802.3 frame, it proceeds to check whether this field specifies an IP frame (step 713). Assuming the frame is an IP frame, the Parsing state machine 401 checks whether it is an IPv4 frame, as in step 717. The Parsing state machine 401 then checks whether the frame is an IGMP frame (step 719). In the event that any of the steps 715, 717, and 719 is determined to be false, the frame is not an IGMP frame.

As described above, the system and method for generating a forwarding descriptor in a network interface device utilizes state machines encompassing logic engines 101, 103, 105, and 107. The various state machines execute ingress and egress functions concurrently on different data frames, thereby achieving greater data throughput. Furthermore, the ingress state machines (401, 403, 405, and 407) internally perform concurrent operations independent from the egress state machines (407, 409, 411, 413, and 415). The egress state machines likewise process in a pipelined manner.

While this invention has been described in connection with what is presently considered to be the most practical and preferred embodiments, it is to be understood that the invention is not limited to the disclosed embodiments, but, on the contrary, is intended to cover various modifications and equivalent arrangements included within the spirit and scope of the appended claims.

What is claimed is:

1. A multiport switch configured for processing a data frame, comprising:

a plurality of ports for outputting the data frame; and rules checker logic configured for operating in a pipeline manner to process the data frame, the rules checker logic comprising:

a plurality of ingress state machines configured for receiving a header of the data frame, determining data frame type, and extracting or deriving frame information from the header, each of the ingress state machines concurrently processing ingress functions based upon on portions of the header or the frame information; and a plurality of egress state machines configured for generating a descriptor comprising a port vector that selectively specifies which of the ports the data frame is to be transmitted from or whether the data frame is to be filtered; and port logic configured for receiving and decoding the descriptor from the rules checker logic.

2. The multiport switch as in claim 1, wherein the plurality of ingress state machines comprises:

a parsing state machine for determining the data frame type and for outputting a VLAN check signal to initiate assignment of a VLAN index to the data frame;

an ingress VLAN state machine for determining a VLAN type associated with the data frame in response to the VLAN check signal and subsequently outputting the VLAN index based upon the VLAN type, the ingress VLAN state machine searching a VLAN table for the VLAN index in response to a tagged VLAN type;

an ingress port-index state machine for determining the VLAN index by searching a port-index table based upon a determination that the VLAN type is either an untagged VLAN type or a priority tagged VLAN type in response to the VLAN check signal, the ingress port-index state machine outputting a hash signal to initiate generation of a hash key and a port-index done signal, the port-index done signal being sent to the ingress VLAN state machine that accordingly outputs a VLAN check done signal to the parsing state machine in response to the port-index done signal, the VLAN check done signal indicating that the VLAN index has been determined; and a hash state machine for generating a hash key in response to the hash signal and subsequently outputting a hash complete signal to the parsing state machine, the hash complete signal indicating that the hash key has been generated.

3. The multiport switch as in claim 1, wherein the plurality of egress state machines comprises:

a port vector mask state machine for manipulating the port vector and for outputting a egress check signal to initiate an egress check and a send frame signal to initiate transfer of the descriptor to the port logic;

an egress port-index state machine for determining a VLAN index for the data frame in response to the VLAN check signal from the port vector mask state machine and subsequently outputting an egress check done signal to the port vector mask state machine, the egress check done signal indicating in part that the VLAN index has been determined;

a select state machine for selecting the descriptor or an overflow descriptor for forwarding to the port logic, the select state machine forwarding the overflow descriptor before forwarding the descriptor, wherein the select state machine forwards the descriptor in response to the send frame signal, and thereafter, generates a new frame signal to the port vector mask state machine;

an untag state machine for determining whether the data frame is an untagged VLAN type based upon the header of the data frame and subsequently outputting an untag done signal to the port vector mask state machine, the untag done signal indicating that the VLAN frame type has been determined; and an egress VLAN state machine for determining a VLAN identifier based upon the VLAN index of the data frame and subsequently outputting a VLAN map done signal to the port vector mask state machine.

4. The multiport switch as in claim 1, wherein the plurality of egress state machines is configured to modify the port vector based upon:

performing a spanning tree check;

determining whether the data frame was received via the one of the ports;

determining whether the data frame was received via a last cascade port;

executing a trunk algorithm to load balance among a portion of the plurality of ports;

performing a VLAN egress rules check; and determining whether the one or more of the ports is a sniffer port.

5. The multiport switch as in claim 2, wherein the parsing state machine determines whether the data frame type is IGMP (Internet Group Management Protocol).

6. The multiport switch as in claim 1, wherein the plurality of egress state machines is configured to determine whether the one or more of the ports belongs to a VLAN member set.

7. The multiport switch as in claim 2, wherein the ingress VLAN state machine and the ingress port-index state machine operate concurrently in response to the VLAN check signal.

8. The multiport switch as in claim 1, wherein the descriptor comprises an operation code that indicates a method of modifying the data frame.

9. The multiport switch as in claim 6, wherein the ingress VLAN state machine waits for the ingress port-index state machine to output the VLAN index if the VLAN type is either the tagged VLAN type or the priority-tagged VLAN type.

10. The multiport switch as in claim 8, wherein the ingress VLAN state machine generates the operation code based upon an unknown VLAN identifier associated with the tagged VLAN type.

11. A method of forwarding a data frame in a switching system having a plurality of ports for outputting the data frame, the method comprising the steps of:

performing ingress functions using a plurality of ingress state machines, wherein the ingress functions comprises:

receiving a header of the data frame;
determining data frame type; and
extracting or deriving frame information from the header;
performing egress functions, independent from and concurrent with the ingress functions, using a plurality of egress state machines, the egress functions comprise generating a descriptor comprising a port vector that selectively specifies which of the ports the data frame is to be transmitted from or whether the data frame is filtered; and
receiving and decoding the descriptor that comprises a port vector.

12. The method as in claim 11, wherein the step of performing ingress functions further comprises:
determining the data frame type using a parsing state machine, the parsing state machine outputting a VLAN check signal to initiate assignment of a VLAN index to the data frame;
determining a VLAN type associated with the data using an ingress VLAN state machine in response to the VLAN check signal and subsequently outputting the VLAN index based upon the VLAN type, wherein the ingress VLAN state machine searches a VLAN table for the VLAN index based upon a determination that the data frame is of a tagged VLAN type;
determining the VLAN index using an ingress port-index state machine by searching a port-index table based upon a determination that the VLAN type is either an untagged VLAN type or a priority tagged VLAN type in response to the VLAN check signal;
outputting a hash signal to initiate generation of a hash key and a port-index done signal using the ingress port-index state machine, the port-index done signal being sent to the ingress VLAN state machine that accordingly outputs a VLAN check done signal to the parsing state machine in response to the port-index done signal, the VLAN check done signal indicating that the VLAN index has been determined; and
generating a hash key using a hash state machine in response to the hash signal and subsequently outputting a hash done signal to the parsing state machine, the hash done signal indicating that the hash key has been generated.

13. The method as in claim 11, wherein the step of performing egress functions further comprises:
manipulating the port vector and for outputting an egress check signal to initiate an egress check and a send frame signal to initiate transfer of the descriptor using a port vector mask state machine;
determining a VLAN index for the data frame in response to the VLAN check signal from the port vector mask state machine;
outputting an egress check done signal to the port vector mask state machine using an egress port-index state machine in response to the determining the VLAN index step, the egress check done signal indicating that the VLAN index has been determined;
selecting the descriptor or an overflow descriptor for forwarding to the port logic using a select state machine, the select state machine forwarding the overflow descriptor before forwarding the descriptor, wherein the select state machine forwards the descriptor in response to the send frame signal, and thereafter, generates a new frame signal to the port vector mask state machine;
determining whether the data frame is an untagged VLAN type based upon the header of the data frame and subsequently outputting an untag done signal to the port vector mask state machine using an untag state machine, the untag done signal indicating that the data frame type has been determined; and
determining a VLAN identifier based upon the VLAN index of the data frame and subsequently outputting a VLAN map done signal to the port vector mask state machine using an egress VLAN state machine.

14. The method as in claim 11, wherein the plurality of egress state machines executes the steps of:
performing a spanning tree check;
determining whether the data frame was received via the one or more ports;
determining whether the data frame was received via a last cascade port;
executing a trunk algorithm to load balance among a portion of the plurality of ports;
performing a VLAN egress rules check; and
determining whether the one or more of the ports is a sniffer port.

15. The method as in claim 11, wherein the step of determining the data frame type comprises determining whether the data frame type is IGMP (Internet Group Management Protocol).

16. The method as in claim 11, wherein the descriptor comprises an operation code that indicates a method of modifying the data frame.

17. The method as in claim 16, wherein the rules checker logic comprises generating the operation code based upon an unknown VLAN identifier associated with the tagged VLAN type.

18. The method as in claim 11, wherein the step of performing egress functions further comprises determining whether the one or more of the ports belongs to a VLAN member set.

* * * * *